(12) United States Patent
Hille

(10) Patent No.: US 6,559,220 B2
(45) Date of Patent: *May 6, 2003

(54) WATER-DILUTABLE STONE IMPACT PROTECTION PAINT AND COMPENSATION PAINT, THEIR USE AND PROCESS FOR THEIR PRODUCTION

(75) Inventor: Hans-Dieter Hille, Bergisch Gladbach (DE)

(73) Assignee: Bollig & Kemper GmbH & Co. KG, Köln (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/596,321
(22) PCT Filed: Jun. 19, 1995
(86) PCT No.: PCT/DE95/00767
§ 371 (c)(1),
(2), (4) Date: Mar. 22, 1996
(87) PCT Pub. No.: WO95/35350
PCT Pub. Date: Dec. 28, 1995

(65) Prior Publication Data
US 2002/0013400 A1 Jan. 31, 2002

(30) Foreign Application Priority Data
Jun. 20, 1994 (DE) .......................... 44 21 172
Feb. 15, 1995 (DE) .......................... 195 04 947

(51) Int. Cl.$^7$ .......................... C08L 67/06; C08J 11/00
(52) U.S. Cl. .................. 524/500; 524/591; 524/839; 524/840; 428/903.3; 427/407.1; 427/409; 239/120; 239/124; 521/40; 521/40.5
(58) Field of Search ................... 524/500, 591, 524/839, 840; 521/40.5, 40; 428/903.3; 427/409, 407.1; 239/120, 124

(56) References Cited

U.S. PATENT DOCUMENTS

| | | | | | |
|---|---|---|---|---|---|
| 3,981,320 A | * | 9/1976 | Wiggins | ..................... | 137/240 |
| 5,017,673 A | * | 5/1991 | Balatan | ..................... | 528/59 |
| 5,100,735 A | * | 3/1992 | Chang | ..................... | 428/515 |
| 5,326,815 A | * | 7/1994 | Serdiuk et al. | ..................... | 524/591 |
| 5,393,390 A | * | 2/1995 | Freese et al. | ..................... | 264/131 |
| 5,856,382 A | * | 1/1999 | Ohrbom et al. | ..................... | 523/414 |

FOREIGN PATENT DOCUMENTS

WO    WO9213644    *   8/1992

* cited by examiner

Primary Examiner—Terrel Morris
Assistant Examiner—John J. Guarriello
(74) Attorney, Agent, or Firm—Cohen, Pontani, Lieberman & Pavane

(57) ABSTRACT

The invention relates to the preparation of a water-dilutable stone impact protection and of a compensation paint and its use and processes for their production, especially in the automobile industry. The water-dilutable stone impact protection paint contains 20 to 60 wt % binder and 2 to 10 wt % pigments and possibly uncoagulated overspray of water-soluble base paints and the compensation paint contains 40 to 80 wt % binder.

28 Claims, No Drawings

WATER-DILUTABLE STONE IMPACT PROTECTION PAINT AND COMPENSATION PAINT, THEIR USE AND PROCESS FOR THEIR PRODUCTION

The invention relates to the preparation of a water-dilutable paint capable of protecting a painted surface against stone chips and compensation primer, to their use and to processes for producing the same, especially in the motorcar industry.

DESCRIPTION OF PRIOR ART

A basic problem in the lacquering of surfaces, particularly surfaces of automobile bodies, is the resistance of the overall lacquer to chipping by stones. The stone impact resistance of conventional paints depends substantially on the surface primer layer located on the electrocoat layer. The surface primer layer, having a thickness of about 30 to 40 μm, smoothes the rough surface of the crude automobile body to allow subsequent coating with a covering lacquer, fills up minor surface inequalities, and mainly offers protection against mechanical attacks (stone chip protection function).

A conventional automobile lacquer coating according to the so-called "base coat/clear coat process" consists, for example, of a total of four layers. These four layers are applied one after the other in separate lacquering devices. The first layer, directly located on the car sheet metal, is the electrocoat layer which is applied by electro-dipcoating—mainly cathodic dipcoating (CDC)—for protection against corrosion. The nature of the electro-dipcoating prevents the formation of overspray.

The second layer, located on the electrocoat layer and having a layer thickness of about 30 to 40 μm is the so-called surface primer layer which, on the one hand, smoothes the rough surface of the crude automobile body to allow subsequent coating with a covering lacquer, it also levels minor surface inequalities and mainly offers protection against mechanical attacks (stone chip protection function). This layer is substantially produced by electrostatic application of a baking enamel, for example, with electrostatic high rotation bell, followed by baking at temperatures of above 160° C.

The third layer, located on the surfacer primer layer, is the base coat layer which imparts to the automobile body the desired color by virtue of adequate pigments. The water soluble base coat is applied by conventional spray methods.

The fourth and uppermost layer, located on the base coat layer, is the clear coat layer which, analogous to the base coat layer, is applied by conventional spray methods and, which on the one hand, imparts the desired lustre and, on the other hand, protects the base coat against environmental factors (UV radiation, salt water etc.).

The object of the invention is to produce a paint which protects against stone chip which meets the requirements of the tests prescribed by the automobile industry and, at the same time, takes over the function of the conventional surface primer layer or the function of the conventional surface primer layer and the conventional base coat layer.

SUMMARY OF THE INVENTION

This problem is solved in the present invention by providing a water-dilutable paint capable of protecting the painted surface against stone chips (hereinafter referred to as "stone chip protection paint"), containing from 20 to 60% by weight binders and from 2 to 10% by weight pigments, and a water-dilutable compensation primer, containing from 40 to 80% by weight binders. The compensation primer may additionally contain up to 20% by weight pigments.

Pigments, as defined by the present invention, include inorganic or organic multicoloured or achromatic colorants that are practically insoluble in the medium in which they are applied, such as described, for example, in "Glasurit-Handbuch Lacke und Farben", 11th edition, published by Curt R. Vincentz, Hannover 1984, p. 97–108, i.e. carbon black titanium dioxide, effect pigments, such as aluminum bronzes, mica pigments and the like.

A binder as defined here and in the text following includes substances which bond together similar or different kinds of substances, in particular the non-volatile component of a lacquer without pigment and filler, but including plasticizers, drying agents and other non-volatile additives, preferably the water compatible film-forming resins, such as polyester, polyurethane and acrylate resins and the like, as described, for example, in "Glasurit-Handbuch Lacke und Farben", loc. cit. p. 19–96 or in H. Wagner, H. F. Sarx "Lackkunstharz e", Carl Hanser Verlag Munich 1972.

In a further embodiment of the invention, the ratio of binders to pigments in the water-dilutable stone chip protection paint is between 5:1 and 12:1 or between 10:1 and 15:1 in the case of the water-dilutable compensation primer.

Inasmuch as the water-dilutable stone chip protection paint or the compensation primer contains pigments, the latter can be an effect pigment, in particular an aluminium bronze.

In a preferred embodiment of the invention, the binder of the stone chip protection primer or the compensation paint is a water compatible blocked isocyanate, a polyurethane resin, a polyester resin and/or melamine resin.

In a further embodiment of the present invention, the polyester resin has of the present invention a molecular weight of from 5,000 to 10,000; exhibits an adequate number of carboxyl groups which after neutralization with bases impart to the polyester resin sufficient water-dilutable properties; and contains functional groups, in particular hydroxyl groups which render the polyester resin cross-linkable.

The polyester resin can have an OH number of from 20 to 80, in particular from 30 to 60 and an acid number between 10 and 50, in particular from 15 to 35.

Its glass transition temperature (Tg) may be between −20 and +30. In a further embodiment of the invention, the polyester resin is in particular a polycondensation product of a diol and a dicarboxylic acid in the presence of a component containing more than 2 functional groups.

The diol is selected from the group consisting of 1,6-hexanediol, neopentyl glycol, 1,4-dimethylolcyclohexane, hydroxypivalic acid neopentyl glycol ester (HPN), perhydrogenated bisphenol A, trimethylolpropane and trimethylolpropane monoallyl ether.

The dicarboxylic acid is selected from the group consisting of adipic acid, phthalic acid, isophthalic acid, hexahydrophthalic acid, tetrahydrophthalic acid or their possible anhydrides, in particular from the group of dimeric fatty acids.

The component containing more than 2 functional groups may be a triol, a tricarboxylic acid, a monohydroxydicarboxylic acid, in particular a dihydroxymonocarboxylic acid, preferably trimellitic acid, trimethylolpropane and dimethylolpropionic acid.

The best properties can be achieved with binders exhibiting elastomeric characteristics after baking. These can be specific polyurethanes in which, due to their segmented structure, a specific sequence of soft and hard segments is observed. Preferred binders are soft polyester resins having a high molecular weight and a high hydroxy-functionality, obtained by polycondensation of dimeric fatty acids and polyalcohols, preferably diols, their crosslinked sites being produced by trifunctional (hydroxy)carboxylic acids. These polyester resins are also used with blocked polyisocyanates or melamine resins as cross-linking agents.

Furthermore, the water-dilutable stone impact-protection paint or compensation primer can additionally contain organic solvents and additives.

The term solvent as used hereinafter includes those organic substances which can dissolve other substances in a physical manner, such as, e.g., lower alcohols, glycol ether, lower ketones, in particular organic solvents which are substantially miscible with water, such as butanol, isopropanol, methylethyl ketone and many others, such as described for example, in "Glasurit-Handbuch Lacke und Farben", loc. cit. pages 117–138.

Additives are defined as substances that are added in small amounts to other substances, in particular liquid substances, to change their properties in a desired manner or to facilitate their processing. Additives include gloss products, wetting agents, drying agents sedimentation inhibitors, antifloating agents, film-inhibiting agents, leveling agents, release agents, lubricants as well as UV absorbers, biocides, plasticizers, antistats, stabilizers, antioxidants, antiozonants, fillers, viscosity control agents, aging inhibitors, detergents, dispersing agents, defoamers, setting accelerators, solidification retarders or drying agents, as described, e.g., in "Glasurit-Handbuch Lacke und Farben", loc. cit. p. 113–117.

The invention also relates to the use of a water-dilutable stone chip protection paint for coating automobile bodies having an electro-dip primer coat, a second so-called surface primer layer, a third layer comprising a water-soluble base coat, and a fourth layer comprising a covering layer of clear coat, the surface primer layer being replaced by a stone chip protection layer consisting of the stone chip protection paint and having a thickness of from 10 to 20 µm.

In a further embodiment of the present invention, the water-dilutable stone chip protection paint is used for coating automobile bodies having an electro-dip primer coat, a stone chip protection layer consisting of the stone chip protection paint and having a thickness of from 10 to 20 µm, and a covering layer of clear coat.

The water-dilutable compensation primer of the present invention is used in admixture with a commercial base coat for coating automobile bodies having thereon an electro-dip primer coat, a second so-called surface primer layer, a third layer consisting of a water-soluble base coat and a fourth layer comprising a surface primer covering layer of clear coat, the surface primer layer being replaced by a mixture of water-dilutable compensation primer and a commercial base coat and having a thickness of from 10 to 20 µm.

According to another embodiment of the invention, the water-dilutable compensation primer is used in admixture with a commercial base coat for coating automobile bodies having an electro-dip primer coat, a layer comprising the mixture of water-dilutable compensation primer and commercial base coat and having a thickness of from 10 to 20 µm and a covering layer of clear coat.

Thus, the compensation primer serves to condition the base coat, i.e. it imparts to a conventional base coat stone chip protection and surface primer properties so that the conditioned base coat either replaces only the surface primer layer (four layer-structure); or the surface primer layer and the base coat layer simultaneously (three layer-structure). This conditioning secures in particular the adhesion of the stone chip protection layer in such a manner that if a strong mechanical impact from an outward source acts on the overall lacquering, which if using a three layer-coating (i.e. without surface primer layer) without the layer of the present invention the impact would lead to a chipping off of the electrocoat layer. The adherence to the electrocoat layer is controlled to such an extent that, on the one hand, the stone chip protection layer is released from the electrocoat layer, but does not pull the latter from the automobile sheet metal and, on the other hand, the chip marks are as little as possible. The latter can be achieved by additives which specifically increase the rebound resilience of the stone chip protection paint. Rebound resistance as used herein means the property by means of which a mechanical impulse (stone impact) is counterbalanced by an elastic deformation. Damage of the material is inhibited thereby.

There are different methods of testing the property for predetermined stability of the pertinent layer, namely of said stone impact protection primer or of a base coat conditioned by said compensation paint, said methods being adapted to the specific field of application; however, all of the tests aim at reproducing the mechanical action as exactly as possible. There are, for example, prescribed tests in the automobile industry which try to simulate the stone impact by the impact of a shot (Mercedes-Benz AG, lacquer testing apparatus with shot testing apparatus at temperatures of −20 to +50° C., a shot diameter of from 2 to 4 mm and a shot speed of from 50 to 300 km/h) or a chisel-like testing device (Test VDA 621–428 of BMW-AG) on the finished lacquered surface at exactly defined temperatures (room temperature and −20° C.) and further exactly defined parameters.

In a particularly preferred embodiment of the invention, the water-dilutable stone impact protection paint contains overspray from water-soluble base coats, in particular from spraybooth waste water.

An overspray is the excess of lacquer which during the application of the lacquer by spray painting techniques does not hit the article being lacquered but misses the article and is discharged together with the exhaust air from the lacquering zone in order to be transferred, for example in a wet wash discharge step, to the wash discharge water of the spraybooths—referred to hereinafter as booth waste water—to wash discharge the lacquer components present in the overspray.

A big problem generally encountered in lacquering processes is the waste material, in particular paint sludges. Paint sludges are usually produced when the substantially water-insoluble lacquer components are removed from the booth waste water by coagulation to allow the booth waste water, recovered after sedimentation or separation of the paint sludge, to be recycled for reasons of environmental protection.

In view of the high costs of waste disposal, the lacquer manufacturing and the lacquer processing industries are increasingly interested in applying new methods to avoid this kind of waste. To this end, there are basically two possibilities. On the one hand, one is trying to practically inhibit the formation of an overspray right from the beginning by applying specific and more sophisticated lacquering methods. The latter include flow coating, casting, dipcoating, roll coating, coil coating, electro-dipcoating or the like. On the other hand, one is trying to recycle the overspray which is necessarily always formed, for example, when using spray painting techniques. At present, the degree of coating efficiency of this spraying method (air, airless or air mix atomization etc.) is from 20 to 80%, i.e. only from 20 to 80% of the sprayed lacquer hit the surface of the article being lacquered, the rest accrues as overspray.

A conventional water-soluble base coat usually consists of from 5 to 15% by weight pigments, from 10 to 20% by weight binders 0 to 20% by weight organic solvents 0 to 5% by weight additives 40 to 85% by weight water.

A particularly serious problem is the recycling of base coat oversprays. Since, for logistic reasons, the automobile bodies in a factory are not sprayed serially with the different colors (i.e. not only black on Mondays, only white on Tuesday and only red bodies on Wednesdays etc.) but several color shades are sprayed within one hour. One always obtains a variable amount of water-soluble base coat overspray of different colors in the booth waste water. Therefore, the booth waste water has an unsightly shot color from sludgy brown to dirty gray. This excludes the return of this component to the base coat being coated, as proposed in DE-OS 42 13 671.

To date, in all automobile body lacquering plants, the overspray booth waste waters containing is converted into a lacquer sludge by coagulating agents. In former times, this lacquer sludge was transported to a waste dump, which is now forbidden by law. Therefore, nowadays this coagulate or paint sludge, which still contains about 50% by weight water, is reprocessed, after removal of the main amount of water, drying in rotating tubular kilns and grinding to form granulates or powder, and is reutilized for other purposes. This means in the case of the granulates, that they are disposed of by the so-called "thermal recovery", i.e. incineration of special waste. The energy recovered thereby does neither compensate the loss of material nor the expenditure of method and capital.

The recovery of the booth waste water-overspray in the sense of a recycling to the spraying process, i.e. a recovery on a higher level, is only possible in the processing of water thinnable lacquers. Water thinnable lacquers are those systems which contain, besides the conventional lacquer components, water-dispersible binders and which have water as the main solvent. When using water thinnable lacquers in spray coating techniques, one has the possibility of precipitating the overspray in the booth waste water in such a manner that coagulation does not take place. Thus, the booth waste water becomes a very diluted water thinnable lacquer which can be extracted from excess water by suitable methods and be reutilized as lacquer. Thus, DE-OS 42 13 671 describes a process for recovering the overspray from aqueous coating compositions during spray coating in water dripping spraybooths by means of ultrafiltration which allows to concentrate the enriched booth waste water (retentate) to a solids content of up to 35% by weight. DE-OS 42 07 425 describes a process for recovering the lacquer overspray of aqueous lacquers during spray coating by ultrafiltration and subsequent electrophoresis. Further processes for recovering water thinnable lacquer oversprays are described in DE-OS 34 28 300, CH-OS 1656/59, DE-OS 41 33 130 and DE-OS 42 02 539.

It has also been contemplated to recycle the booth waste water until a water thinnable lacquer concentration is obtained in said booth waste water which permits the direct use of the latter as thinnable lacquer. JP-PS 49 51 324 teaches to increase the concentration of lacquer in the lacquer-containing precipitate by removal of water from the entire booth waste water to such an extent that this precipitate can be reutilized for color spray painting. However, practical tests showed that a concentration of thinnable lacquers in booth waste water to a solids concentration of more than 2% by weight results in that the overspray is no longer completely washed out and the discharged exhaust air contains more overspray than is prescribed by the law (technical instructions on air quality control). The solids concentration refers to the overall amount of non-volatile lacquer components, such as pigments, binders, additives etc., expressed as weight percent, based on the total content of all lacquer components.

DE-OS 42 13 671 and 41 33 130 teach methods of recovering the oversprays of aqueous coating compositions during spray coating in spray booths according to which part of the liquid circulating in the ultrafiltration cycle is used as aqueous coating composition for spray coating. This circulating liquid is always added to the same spraying composition from which overspray it is obtained.

The overspray comprising aqueous base suitable for producing a stone impact protection layer which dries at from 50 to 90° C. is used according to the invention between the electrocoat layer and the base lacquer layer.

For the purposes of the invention, this overspray can be recovered by any conventional method. Its accumulation can be effected, for example, according to the lacquer recovery methods described in I-Lack 61 (1993), p. 425–428 (washer device, recovery wall, recovery belt, Relas lamella-recovery system). The overspray is preferably by means of any prior art wet wash-out method in a condition allowing its use according to the present invention. This wet wash out results in an accumulation of the overspray in the booth waste water.

With respect to the composition of the individual lacquer components, the overspray in the booth waste water has a different composition from the base coat since, for example, the evaporation of the volatile organic solvents is quicker and, they, escape to the atmosphere together with the exhaust air from the spraybooth.

The booth waste water normally consists of form 0.1 to 1.5% by weight pigments, from 0.1 to 2.0% by weight binders, from 0 to 2.0% by weight organic solvents, from 0 to 0.5% by weight additives and from 94 to 99.8% by weight water.

Booth waste water containing an overspray which consists of water-soluble base coats of different colors is preferably used for the purposes of the invention.

This booth waste water is preferably used in a water-depleted upgraded form in the light of the invention. This upgrading by water depletion can be effected by any separation procedure familiar to the expert, such as concentration by vaporization, concentration by boiling in vacuo, freezing out, centrifugation or freeze drying. An upgrading of the booth waste water is usually conducted by ultrafiltration or a combination of ultrafiltration and electrophoresis (DE-OS 42 97 425).

This upgraded booth waste water has a solids concentration of from 10 to 35% by weight. In upgrading the overspray absorbed in water, there are changes with respect to the composition of the concentrate because, for example, preferably water-insoluble and high molecular weight components such as pigments and binders are retained by ultrafiltration while the water soluble and low molecular weight components, such as solvents, melamine resins and neutralizing agents preferably are transferred to the permeate. The water depletion can also result in a change of the properties of the paint components, such as color shade and rheology.

The upgraded booth waste water usually consists of from 2 to 12% by weight pigments, from 4 to 18% by weight binders, from 0 to 5% by weight organic solvents, from 0 to 0.8% by weight additives, from 64 to 94% by weight water.

Thus, by virtue of the production of the stone chip protection paint of the present invention, a big problem of the spray coating technique according to the "base coat/clear coat" method is solved because all of the overspray accrued in the spray coating of the base coat layer in the booth waste water can be utilized. This means that it is no longer necessary to coagulate booth waste water and, as a result, paint sludge is not obtained when the base coat layer is applied.

In addition, this means that both the base coat overspray as well as the overspray of the stone chip protection paint recovered therefrom can be blended in one booth waste water.

A basic advantage of using booth waste water for producing stone chip protection paint is that although the booth waste water may contain different color shades of the water-soluble base coats, it can, nevertheless, be reutilized as valuable material.

A further particular advantage in replacing the conventional filler layer by the stone chip protection layer of the presents invention consists in the fact that the baking of this surface primer (filler) layer can be dispensed with. The stone chip protection layer of the present invention dries at a temperature of between 50 and 90° C. and, consequently, necessitates, for example, only a drying or a predrying with infrared radiation. This means a considerable saving of energy and time. Moreover, it is not necessary to apply the stone chip protection layer of the present invention with the same layer thickness as the surface primer layer; it is enough if said stone chip protection layer has a thickness between 10 and 20 $\mu$m or sufficient to possess the same mechanical properties as the conventional surface primer layer. This also means a considerable saving of material.

A further advantage over the prior art is only two instead of three booth waste water cycles have to be installed. The recycling of the clear coat, e.g. by ultrafiltration, makes it possible to run for the first time an automobile standard processing which is completely free of paint sludge. When water-borne clear coats are used, it is even possible to run the process with only one booth waste water cycle if the coating efficiency of the water borne clear coat application is optimized by suitable methods such that the accrued amounts of overspray do not exceed the requisite amount of the stone chip protection paint of the present invention. Besides, the requisite amount of stone chip protection paint can be controlled by varying the layer thickness, (in particular heightening).

In case the stone chip protection paint, manufactured according to the invention from the concentrated booth waste water, does not exhibit the desired protective properties against mechanical load acting on the overall lacquering from outside, it can be conditioned as specified in the invention.

This conditioning is effected by adding the components necessary for the desired properties of the stone chip protection layer. It may also be advantageous to remove the effect pigments, partly or completely.

The object of this conditioning is, in particular, to adjust the adhesion of the stone impact protection layer in such a manner that if a strong mechanical load acts on the overall lacquering from outside, which without the stone chip protection paint of thee invention and the use of a three-layer lacquering (i.e. without surface primer layer) would entail a chipping off of the electrocoat, the adhesion to the electrocoat layer is adapted in such a manner that, on the one hand, the stone chip protection layer is released from the electrocoat layer but the latter is not torn off therewith from the automobile body and, on the other hand, the chips on the paint surface are as small as possible. The latter can be achieved by additives which increase the rebound resilience of the stone chip protection paint to a predetermined degree. The term rebound resilience stands for the property by means of which a mechanical impulse (stone impact) is compensated by an elastic deformation. Damage of the material is thus inhibited.

The above-mentioned mechanical loads acting on the overall lacquering from outside may involve any kind of mechanical action, such as, for example, stone impact on automobile lacquerings, frictional contact or impact contact between lacquered articles or any kind of objects on laquered surfaces.

For conditioning the mechanical properties of the stone chip protection paint of the present invention, binders, such as a water compatible blocked isocyanate, a melamine resin, a polyurethane resin or polyester resin can be used; organic solvents, pigments or additives can also be used as suitable components.

These components can be added to the stone chip protection paint alone or in any combination or also as compensation paint having a solids concentration of from 20 to 80% by weight.

This compensation paint contains all or parts of the components necessary for conditioning the desired mechanical properties of the stone impact-protective layer.

Thus, a stone chip protection layer cycle is formed according to the invention, to which base coat overspray and compensation primer are periodically added.

Subsequent to the conditioning of the upgraded booth waste water, an equilibrium is established after some time within said cycle which can be maintained by the appropriate amount of compensation paint, which can be easily determined by the expert.

The particular advantage in the use of the compensation paint resides in that all components can be added to the stone chip protection paint, adapted to the pertinent base coat system, to the corresponding overspray or to the booth waste water, and that in a single mixing procedure directly in the spray coating plant or its direct neighborhood. Therefore, the concentrated booth waste water, which can contain up to 90% water, must not be transported from the lacquer processing plant to another place where it is tested in respect of the properties required for the stone chip protection layer and, if desired, conditioned by the method of the present invention, but all these procedures can be done in the same place where the lacquering is conducted.

DESCRIPTION OF THE OREFERRED EMBODIMENTS

The higher the concentration of the compensation paint, the less water must be removed from the booth waste water. The process of lacquering automobile bodies comprises applying an electro-dipcoat primer (CDC), baking the same, applying the stone chip protection paint of the present invention, drying the same at 50–90° C., applying a base lacquer, drying the same at 50–100° C., applying a clear coat and subsequently jointly baking the three lacquer layers at 130–160° C.

The stone chip protection paint of the present invention can be used for lacquering all solid, planar or non-planar, smooth or uneven metallic surfaces which are coated according to the above-specified "base coat/clear coat process" and which are to be protected against mechanical load outwardly acting on the overall lacquer, said protection paint being located between the electrocoat layer and the base coat layer. Smooth metallic surfaces, such as occur in the lacquering of plants, apparatuses, windows, in particular motor vehicles (cars, trucks, bikes etc.) are mainly involved.

The following examples will illustrate the invention.

EXAMPLES

Preparation Example A of a Polyester Resin

In a reactor provided with stirrer, condenser and heater, as well as a packed column, 1187 g 1,6-hexanediol and 1473 g dimeric fatty acid (Pripol 1009 of the UNICHEMA company) are weighed and heated such that the head temperature of the column does not exceed 100° C. The maximum esterification temperature amounts to 220° C. When the acid number is below 5, cooling to 150° C. is effected and 1499 g admerginic acid (an addition product of linseed oil fatty acid and maleic anhydride, commercial product of the HARBURGER FETRCHEMIE) are weighed. Heating is again conducted in such a manner that the head temperature of the column does not exceed 100° C. The maximum esterification temperature amounts to 220° C. Cooling is effected at an acid number of 38, followed by dilution with 1658 g Butyl glycol. A polyester having a solids content of 70% and a hydroxyl number of 57 is recovered.

Preparation Example B of a Polyester Resin

In a reactor provided with stirrer, condenser and heater, as well as a packed column, 598 g dimethylolcyclohexane, 3098 g dimeric fatty acid (pripol 1009 of the UNICHEMA company) and 371 g dimethylolpropionic acid are weighed and heated in such a manner that the head temperature of the column does not exceed 100° C. The maximum esterification temperature amounts to 220° C. Cooling is effected at an acid number of 30, followed by dilution with 1651 g butyl glycol. A polyester having a solids content of 70% and a hydroxyl number of 30 is obtained.

Example 1
(Compensation Paint)

337 parts of a polyester resin of preparation example A are mixed with a blend of 227 parts of fully desalted water and 12 parts dimethylethanol amine with stirring. 39 parts of the commercial melamine resin Luwipal LR 8852 are added thereto with further stirring. The pH value is 9.06. The viscosity is adjusted by fully desalted water to 130 sec., measured in DIN4(German standard) cup.

Example 2
(Compensation Paint)

404 parts of the polyester resin of preparation example B are mixed with a blend of 457 parts of totally desalted water and 10 parts dimethylethanol amine with stirring. 47 parts of the commercial melamine resin Luwipal LR 8852 are added thereto with further stirring. The pH value is 9.06, The viscosity is adjusted by fully desalted water to 130 sec., measured in DIN 4 cup.

Example 3
(Compensation Paint)

206 parts of the polyester resin of preparation example B are mixed with stirring with a blend of 289 parts totally desalted water and 7.5 parts dimethylethanol amine. 298 parts of the blocked isocyanate Bayhydrol LS 2050 of the Bayer AG company Leverkusen are added thereto with further stirring. The pH value is adjusted with an aqueous 10%-dimethylethanol amine solution to 8.5. The viscosity is adjusted by fully desalted water to 130 sec., measured in a DIN 4 cup.

Example 4
(Reprocessing of Overspray)

A laboratory spray booth having a water capacity of 250 liters was filled with fully desalted water. Five different water base coat-color shades, prepared as described in European patent 502 934, were sprayed with a flow beaker spraying gun. About 2 to 3 kg of each color shade were consumed until the solids content of the booth recycling water has increased to 1%.

The so-obtained booth water was upgraded to a solids content of 18% by ultrafiltration.

Example 5
(Stone Chip Protection Paint)

2 parts of the commercial melamine resin Cymel 327 are added to 390 parts of the retentate of the above-described reprocessing with stirring. 268 parts of the compensation paint of example 1 are added to this blend and the viscosity is adjusted to 35 sec. by fully desalted water.

Example 6
(Stone Chip Protection Paint)

78 parts of each of the same five water base lacquer-color shades which were used to simulate the overspray (as described in example 4) are mixed with stirring. 268 parts of the compensation paint of example 1 is added thereto, likewise with stirring. After adjusting the pH value to between 9.0 and 9.1, the viscosity is adjusted by fully desalted water to 35 sec.

The stone chip protection paints were sprayed according to conventional methods on phosphated sheet steels coated with a commercial electro-dipcoat. After a flash off time of 3 minutes, drying was conducted at three different temperatures. One part of the sheets was dried for 10 minutes at 100° C., the second part for 10 minutes at 130° C. and the third part for 10 minutes at 105° C. The dry layer thicknesses were between 14 and 19 μm. Thereafter, all sheets were overpainted in a conventional manner with commercial water base coat and 2 components clear coat comprising mainly isocyanate.

Example 7
(Base Coat with Integrated Stone Impact Protection Paint)

100 parts of a metallic base coat with a silver color shade, prepared as described in European Patent 502 934, were blended with 135 parts of the compensation paint of example 3 with stirring, and adjusted to a viscosity of 45 sec. (DIN 4).

The so-modified base coat is sprayed on phosphated sheet steels coated with a commercial electro-dipcoat and after a flash off time of 5 minutes is overpainted with clear coat. The layer thickness of the first modified base coat layer was 9 μm and that of the second unmodified layer 7 μm.

All sheets exhibited a good appearance, comparable to conventional standards.

The sheets were subjected to a stone impact test, as is common at Mercedes Benz AG. To this end, the test sheets were first cooled to −20° C. and were shot with a steel ball having a diameter of 3 mm at a speed of 250 km/h. A penetration up to the sheet should not occur thereby and the chip marks should not be greater than 8 mm$^2$. All test sheets passed this test.

What is claimed is:

1. A water-dilutable stone chip protection paint for an automobile body comprising from 20% to 60% by weight of at least one binder and from 2% to 10% by weight of a pigment and uncoagulated overspray of a water dilutable base coat.

2. The water-dilutable stone chip protection paint of claim 1, wherein the uncoagulated overspray is of at least two base coats of different colors.

3. The water-dilutable stone chip protection paint of claim 1, further comprising at least one of an organic solvent and an additive.

4. The water-dilutable stone chip protection paint of claim 3, wherein said organic solvent in at least partly miscible with water.

5. The water-dilutable stone chip protection paint of claim 1, wherein said least one binder of the water-dilutable stone chip protection paint is water compatible and is selected from the group consisting of a blocked isocyanate, a polyurethane resin, a polyester resin, and a melamine resin.

6. The water-dilutable stone chip protection paint of claim 5, wherein said polyester resin contains carboxylic groups which impart to the polyester resin, after neutralization with a base, water-dilutable characteristics, and contains functional groups, making the polyester resin crosslinkable.

7. The water-dilutable stone chip protection paint of claim 6, wherein said functional groups are hydroxyl groups.

8. The water-dilutable stone chip protection paint of claim 6, wherein said polyester resin has an OH number of from 20 to 80, and an acid number of from 10 to 50.

9. The water-dilutable stone chip protection paint of claim 8, wherein said polyester resin has a glass transition temperature (Tg) of from −20 to +30° C.

10. The water-dilutable stone chip protection paint of claim 9, wherein said polyester resin is a polycondensation product of a diol and a dicarboxylic acid in the presence of a component containing more than two functional groups.

11. The water-dilutable stone chip protection paint of claim 10, wherein said diol is selected from the group consisting of 1,6-hexanediol, neopentyl glycol, 1,4-dimethylolcyclohexarne, hydroxypivalic acid neopentyl glycol ester (HPN), perhydrogenated bisphenol A, trimethylolpropane and trimethylolpropane monoallyl ether.

12. The water-dilutable stone chip protection paint of claim 10, wherein said dicarboxylic acid is selected from the group consisting of adipic acid, phthalic acid, isophthalic acid, hexahydrophthalic acid, tetrahydrophthalic acid and the anhydrides thereof.

13. The water-dilutable stone chip protection paint of claim 10, wherein said dicarboxylic acid is selected from the group consisting of dimeric fatty acids.

14. The water-dilutable stone chip protection paint of claim 10, wherein the component containing more than two functional groups is a triol, a tricarboxylic acid, a monohydroxydicarboxylic acid, or a dihydroxymonocarboxylic acid.

15. The water-dilutable stone chip protection paint of claim 14, wherein said component containing more than two functional groups is trimellitic acid, trimethylolpropane, or dimethylolpropionic acid.

16. The water-dilutable stone chip protection paint of claim 6, wherein said polyester resin has an OH number of from 30 to 60, and an acid number of from 15 to 35.

17. The water-dilutable stone chip protection paint of claim 1, wherein the ratio of said least one binder to the pigment in the water-dilutable stone chip protection paint is between 5:1 and 12:1.

18. The water-dilutable stone chip protection paint of claim 17, where said pigment is an effect pigment.

19. The water-dilutable stone chip protection paint of claim 18, wherein said effect pigment is aluminum bronze.

20. The water dilutable stone chip protection paint of claim 1, wherein said binder and said pigment are added in form of a compensation paint.

21. The water-dilutable stone chip protection paint of claim 20, wherein the ratio of said binder to said pigment in said compensation paint is between 10:1 and 15:1.

22. The water-dilutable stone chip protection paint of claim 21, wherein the water-dilutable compensation paint further contains at least one of an organic solvent and an additive.

23. A method of applying a multi-layer coating to an automobile body, comprising: applying an electro-dip coat to the surface of an automobile body; baking the electro-dip coat; applying a stone chip protection paint comprising an uncoagulated overspray of at least one water dilutable base coat, comprising from 20 to 60% by weight of at least one binder and from 2 to 10% by weight of a pigment; drying the stone chip protection paint at a temperature of from 50 to 90° C.; applying a water dilutable pigmented base coat; drying the water dilutable pigmented base coat at a temperature of from 50 to 100° C.; applying a clear coat; and baking the base coat and clear coat simultaneously at a temperature of from 130 to 160° C.

24. The method of claim 23 wherein the water-dilutable stone chip protection paint is prepared by concentrating booth waste water containing the uncoagulated overspray of at least one water-dilutable basecoat by water removal to a solids content of from 10% to 35% by weight and adding a compensation paint comprising from 20 to 60% by weight of at least one binder and from 2 to 10% by weight of a pigment.

25. The method of claim 23, wherein said binder is selected from the group consisting of a blocked isocyanate, a polyurethane resin, a polyester resin, and a melamine resin.

26. The method of claim 25, wherein the ratio of said binder to said pigment in said compensation paint is between 10:1 and 15:1.

27. The method of claim 25, wherein the uncoagulated overspray is of at least two base coats of different colors.

28. The method of claim 23, wherein said binder and said pigment are added in form of a compensation paint.

* * * * *